United States Patent [19]
Urkowitz et al.

[11] Patent Number: 5,481,270
[45] Date of Patent: Jan. 2, 1996

[54] RADAR WITH ADAPTIVE RANGE SIDELOBE SUPPRESSION

[75] Inventors: Harry Urkowitz, Philadelphia; Nicholas J. Bucci, Upper Darby, both of Pa.; Jerome E. Freedman, Margate, N.J.

[73] Assignee: Martin Marietta Corporation, Moorestown, N.J.

[21] Appl. No.: 205,471

[22] Filed: Mar. 4, 1994

[51] Int. Cl.$^6$ .................................................. G01S 13/28
[52] U.S. Cl. ........................... 342/101; 342/39; 342/128; 342/132; 342/135; 342/109; 342/162; 367/905
[58] Field of Search ............................ 342/39, 101, 109, 342/128, 129, 130, 131, 132, 134, 135, 136, 145, 146, 159, 162, 195; 367/905

[56] References Cited

U.S. PATENT DOCUMENTS

| | | | |
|---|---|---|---|
| 5,070,337 | 12/1991 | Chen et al. | 342/132 |
| 5,151,702 | 9/1992 | Urkowitz | 342/134 |
| 5,173,706 | 12/1992 | Urkowitz | 342/99 |
| 5,309,161 | 5/1994 | Urkowitz et al. | 342/132 |
| 5,343,208 | 8/1994 | Chesley | 342/196 |
| 5,376,939 | 12/1994 | Urkowitz | 342/134 |

*Primary Examiner*—Ian J. Lobo
*Attorney, Agent, or Firm*—W. H. Meise; C. A. Nieves; S. A. Young

[57] ABSTRACT

A method and apparatus for identifying a remote target includes a transmitter for transmitting pulses of energy toward the target for generating echo signals, and a receiver for receiving the echo signals, and for generating received signals representing the target, noise and clutter. The received signals are applied through a plurality of cascaded channels, each including a Doppler filter cascaded with a multiplier, each also including range sidelobe suppression, for, in each of the cascaded channels, narrowband filtering the signals passing therethrough about a controllable center frequency, and for, if necessary, converting the signals passing therethrough to baseband, for thereby applying one of a plurality of Doppler filtered baseband signals to the input of each of the range sidelobe suppressors of each of the cascaded channels. The power of the Doppler filtered baseband signals in each range bin is evaluated for determining the frequency at which the spectral density is greatest. The center frequency of at least one of the cascaded Doppler channels is controlled such that one of the Doppler channels has its center frequency at the maximum-power frequency.

3 Claims, 4 Drawing Sheets

RADAR WITH ADAPTIVE RANGE SIDELOBE SUPPRESSION

FIELD OF THE INVENTION

This invention relates to radar and similar ranging systems, and particularly to those in which pulse compression and range sidelobe suppression are used.

BACKGROUND OF THE INVENTION

Radar and sonar systems identify targets and the range of targets by transmitting energy toward the target, and measuring the time between the transmission and reception of an echo from the target. Since the transmitted energy tends to spread out as it leaves the transmitter, the power density of the transmitted energy decreases with increasing distance from the transmitter. The transmitted power density is much attenuated when it reaches a target at a great distance from the transmitter. A portion of the attenuated power impinging upon the target is reflected toward a receiver, ordinarily located at the transmitting site, and the power density is again attenuated as it expands through space. When the power arrives at the receiver, it has a very small amplitude, and detection of the signal representing the target in the presence of unavoidable noise and clutter signal components remains one of the major problems in radar system design. Clutter refers to echoes from relatively large, slowly-moving targets, often close to the transmitter site, such as trees moving in the wind, or, in a marine context, from waves.

One way to increase the received signal magnitude to aid in target detection is to increase the transmitted signal magnitude. A possible way to accomplish this increase is to accumulate the energy available for transmission over a predetermined time interval, and to transmit all of the accumulated energy in the form of periodic pulses of relatively large magnitude. Once the magnitude of the transmitted pulses reaches a certain level, it may be more economical to lengthen the pulse duration rather than maintain the same duration and further increase its magnitude. Increasing the pulse duration, however, may tend to reduce the range resolution, which is the accuracy with which the range can be determined. A technique involving frequency dispersion, as by transmitting a variable-frequency "chirp" pulse, allows use of pulse-compression filters at the receiver to reduce the effective pulse duration, to thereby restore range resolution.

Range resolution is also degraded by the sidelobe structure inherent in the sharp-edged pulses produced by pulse techniques. These range sidelobes cause echo signals originating from a target associated with one range "bin" to "leak" into other range bins, such as the adjacent range bins. When one target is large, and produces a large echo signal, the range sidelobes associated with the compressed pulse associated from the echo from the large target may undesirably obscure the corresponding pulse representative of an echo from a small target in an adjacent range bin. In the case of a number of adjacent range pulses which contain echoes from high reflectivity phenomena, these traces will interfere with the measurement of the spectrum of the weather phenomenon in a resolvable range bin (or in an azimuth or elevation volume) which is somewhat removed from them. The interference in the resolvable range, azimuth or elevation volume arises from "clutter flooding", due to the presence of pulse compression sidelobes in the resolvable range bin being measured. One way to reduce the effects of range sidelobes is to reduce the magnitude of the range sidelobes themselves, which can be accomplished by applying a weighting function to a series of the pulses which are pulse compressed. Another technique of range sidelobe suppression which has been used to tend to reduce the effects of masking of targets by large adjacent targets is to apply coding to the transmitted pulse, so that the coding appears in the received echo pulse, and to apply code-matched filtering to the compressed received pulses.

Among the problems in radar-type signal processing is that functions other than detection and ranging are ordinarily performed. For example, Doppler filtering is often performed, to aid in identifying moving targets by suppressing clutter, and to distinguish among targets moving with different radial velocities. These additional processing steps, in turn, give rise to issues relating to the ordering of the processing. A system is described in U.S. Pat. No. 5,173,706, issued Dec. 22, 1992 in the name of Urkowitz, incorporated herein by reference, in which pulse compression precedes filtering by a bank of Doppler filters, and in which the Doppler-filtered signals are either at baseband, or are converted to baseband by multiplication by an exponential or oscillatory signal, in order to reduce the Doppler frequency shift across the filter bandwidth, and in order to reduce cost by permitting all of the filters of the Doppler filter bank to be identical baseband filters. The converted signals are then applied to range sidelobe suppressors. One of the problems with range sidelobe suppression techniques is that they tend to be sensitive to Doppler shifts in the echo pulse.

Another method for reducing range sidelobes is described in U.S. Pat. No. 5,151,702, issued Sep. 29, 1992 in the name of Urkowitz, herein incorporated by reference, in which the transmitted pulses are organized into mutually complementary sets, and in which the mutually complementary sets of pulses are sequentially Doppler filtered, and the filtered pulse sets are, in turn, compressed by filtering matched to the coding. After matched filtering, the resulting mutually complementary compressed pulses are summed, with the result that the main range lobes add, and the undesired range sidelobes cancel. Copending U.S. Pat. No. 5,376,937, filed Jun. 21, 1993 in the name of Urkowitz, and entitled DUAL-FREQUENCY, COMPLEMENTARY-SEQUENCE PULSE RADAR, describes a radar system in which transmission takes place simultaneously at two different frequencies, and in which each of the transmissions is coded with one of mutually complementary codes. This arrangement includes reduced processing time among its advantages.

Doppler filtering may be performed by discrete, inductance-capacitance filters, but modern systems generally use digital signal processing. U.S. Pat. No. 5,343,208, filed Dec. 22, 1992 in the name of Chesley, and entitled RADAR WITH INDIVIDUALLY OPTIMIZED DOPPLER FILTERS, describes a system in which an FFT-like array structure includes weighting elements, and in which the weights are established by a technique in which the input signals are assigned, and in which the output signals are correspondingly assigned in a fashion which defines the desired filter shaping. The actual output signals in response to the assigned input signals are subtracted from the desired output signals to form an error signal set, and the error signal set is recurrently back-propagated through the array to set the weights.

In some situations, the largest amount of clutter occurs at Doppler frequencies at which maximum range sidelobe suppression does not occur. In other words, if the clutter motion is such that the echoes occur at frequencies at which the integrated sidelobe levels are not a null, the clutter signals from one range bin will contribute to the total signal output in adjacent range bins. The presence of clutter, as mentioned above, tends to obscure point targets such as aircraft and missiles, and weak targets such as meteorological phenomena, in the presence of range extended interference such as chaff, precipitation, and sea and ground clutter echoes. This concealment will be especially significant for point targets moving nearly tangentially to the radar system, since their Doppler frequencies will be small, and will lie close to the frequencies of weather phenomena such as storms. Similarly, the presence of weather-phenomena clutter may obscure weak point targets such as aircraft and missiles.

SUMMARY OF THE INVENTION

A method and apparatus for identifying a remote target includes a transmitter for transmitting pulses of energy toward the target for generating echo signals, and a receiver for receiving the echo signals, and for generating received signals representing the target, noise and clutter. The received signals are applied through a parallel arrangement of a plurality of cascaded channels, at least some of which include a Doppler filter cascaded with a multiplier, each also including range sidelobe suppression, for, in at least some of the cascaded channels, narrowband filtering the signals passing therethrough about a controllable center frequency, and for, if necessary, converting the signals passing therethrough to baseband, for thereby coupling one of a plurality of Doppler signals through each of the range sidelobe suppressors of each of the cascaded channels. The power of the Doppler filtered baseband signals in each range bin is evaluated for determining the frequency at which the spectral density is greatest. The center frequency of at least one of the cascaded Doppler channels is controlled such that one of the Doppler channels has its center frequency at the maximum-power frequency. This technique tends to minimize the interfering effects in certain range bins of large amounts of echo power in neighboring range bins, which may be due to high-reflectivity phenomena .

DESCRIPTION OF THE DRAWING

FIG. 2b is a simplified block diagram of the Doppler filter bank of the arrangement of FIG. 2a;

FIG. 5 represents signal processing, which is an alternative to the processing of a portion of FIG. 2a.

DESCRIPTION OF THE INVENTION

The basic purpose of the invention is the optimization of the performance of Doppler tolerant range sidelobe suppression to minimize the interference from range sidelobes, which are a consequence of pulse compression. Doppler tolerant range sidelobe suppression, as described in the abovementioned U.S. Pat. No. 5,173,706, performs best at the center frequencies of the filters in the pulse-to-pulse Doppler filter bank. Within any range bin, the clutter may have a maximum amplitude at a Doppler frequency which is not at a peak of one of the Doppler filters of the Doppler filter bank, with the result that the maximum-amplitude clutter frequency in that particular range bin may not receive the maximum range sidelobe suppression which the Doppler filter/sidelobe suppressor is capable of providing. By using an adaptive Doppler filter bank and a set of adaptive intrapulse Doppler phase compensation digital mixer-multiplier combinations, the maximum response Doppler frequencies may be changed to that set of frequencies that are optimum for the particular environment. This results in maximizing the suppression of the range sidelobes in each range bin. Thus, the method of the invention application comprises two major parts or steps:

1. Determination of the environment by an estimating technique; and
2. Adaptive adjustment of system parameters, based on the results of estimation. The second major step or part has two alternative substeps with respect to the method of filter adjustment:

2(a). The environmental estimate is used to adjust one Doppler filter path, so that the path frequency is the frequency of the maximum of the estimate of the power density spectrum of the current range trace.

2(b). The environmental estimate is used to adjust all of the Doppler frequency paths, such that the Doppler frequency paths remain evenly spaced in Doppler frequency, but with the Doppler path which was initially closest to the maximum of the spectral estimate retuned to that maximum. The whole set of Doppler filter paths remains equally spaced in frequency.

Figure 1:
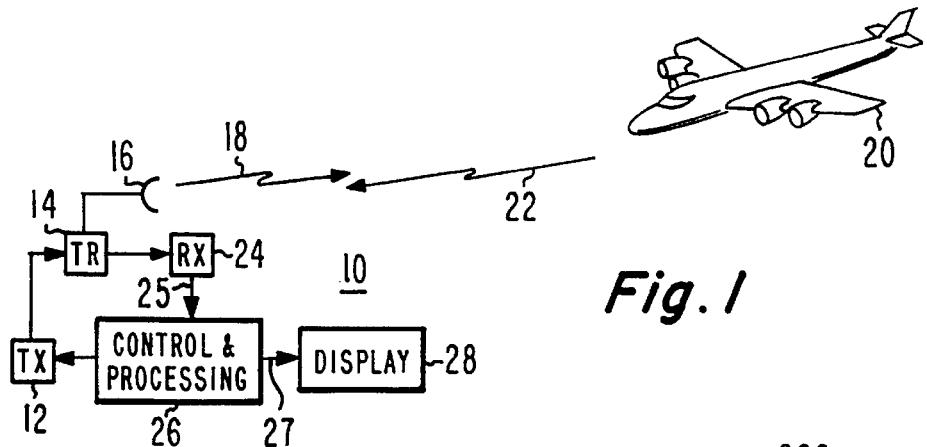
FIG. 1 is a simplified block diagram of a radar system incorporating the invention.

In FIG. 1, a radar system designated generally as 10 includes a transmitter (TX) 12, which generates high-power pulses of electromagnetic energy. Transmitter 12 is coupled to an antenna 16 by way of a transmit-receive (TR) device 14, all in known fashion, for causing transmission of energy, illustrated by arrow 18, toward a target illustrated as an aircraft 20. Target 20 reflects some of the energy incident thereupon to create a reflected echo illustrated by arrow 22. The reflected energy propagates back toward antenna 16, and is routed by TR 14 to a receiver (RX) 24. Receiver 24 processes the received signal, as by low-noise amplification, frequency downconversion, quadrature demodulation, and the like, to produced received signals. The received signals are coupled from receiver 24 to a control and processing arrangement illustrated as a block 26. Block 26 establishes timing for the transmitter and receiver, which allows the distance of the target to be determined from the time delay between transmitted and received signals. Processor 26 also performs various enhancements of the signal, as described below. Ultimately, the processed signals from processor 26 are applied to a display illustrated as a block 28 for display of at least target range and position.

Figure 2A:
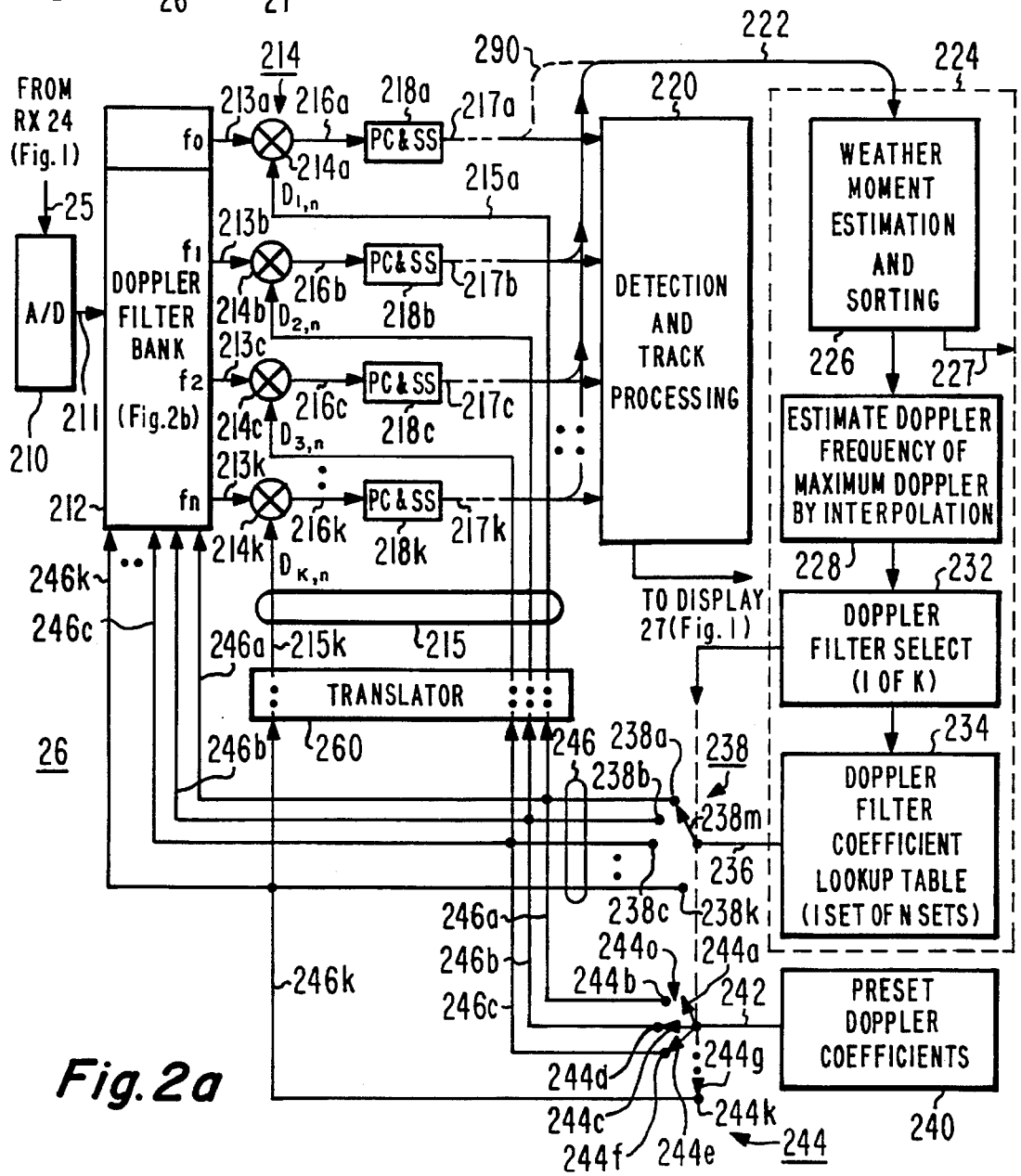
FIG. 2a is a simplified block diagram of a portion of the arrangement of FIG. 1 including a Doppler filter bank, illustrating the invention in more detail.
Figure 2B:
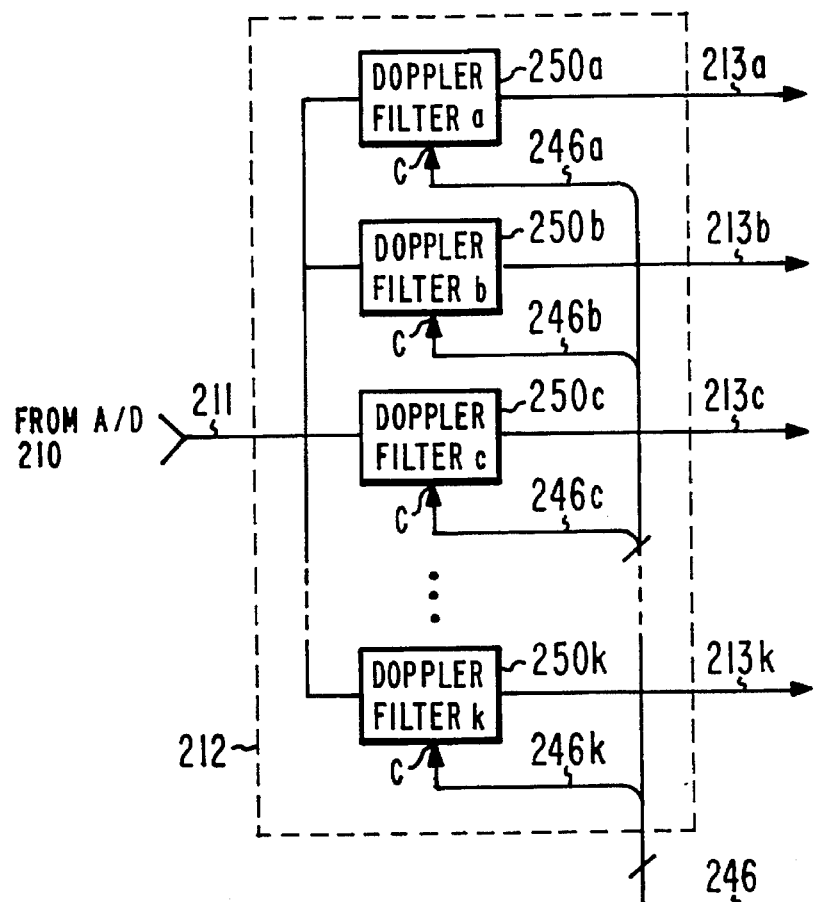

FIG. 2a is a simplified block diagram of control and processing portion 26 of FIG. 1. In FIG. 2a, signal arrives from receiver 24 at an analog-to-digital converter 210, which converts the signals to digital form, preferably parallel digital form, and applies the digital signals by way of a signal path 211 to a Doppler filter bank 212. Signal path 211, and other signal or data paths referred to herein, are digital paths, preferably in multibit parallel format. Doppler filter bank 212 is well known in the art, for separating the various frequency components of the signal into a number of discrete frequency bands. FIG. 2b illustrates details of Doppler filter bank 212. In FIG. 2b, Doppler filter bank 212 includes a plurality of individual Doppler filters 250a, 250b, 250c, ..., 250k, each having its input port coupled to input signal path 211 for receiving digitized echo signals therefrom. Each Doppler filter 250 of Doppler filter bank 212 is tuned to a different frequency, and selectively or preferentially passes that particular frequency to its output port. The output port of each Doppler filter 250 of Doppler filter bank 212 of FIG. 2b is coupled to a corresponding one of output signal paths 213. More particularly, the output port of Doppler filter 250a is coupled to Doppler filter bank 212 output signal path 213a, the output port of Doppler filter 250b is coupled to output signal path 213b, the output port of Doppler filter 250c is coupled to output signal path 213c, ..., and the output port of Doppler filter 250k is coupled to output signal path 213k. Each Doppler filter 250 of Doppler filter bank 212 of FIG. 2b also has a control (C) input port coupled to a portion of a control bus 246. More particularly, Doppler filter 250a of Doppler filter bank 212 has its control input port C coupled to a portion 246a of bus 246, Doppler filter 250b of Doppler filter bank 212 has its control input port C coupled to a portion 246b of bus 246, Doppler filter 250c of Doppler filter bank 212 has its control input port C coupled to a portion 246c of bus 246, ..., and Doppler filter 250k of Doppler filter bank 212 has its control input port C coupled to a portion 246k of bus 246. Each Doppler filter 250 of Doppler filter bank 212 provides narrowband filtering of the digitized signals applied to its signal input port from signal path 211, at a frequency established by filter coefficients applied to its C input port over its portion of bus 246.

As described in more detail in U.S. Pat. No. 5,173,706, issued Dec. 22, 1992 in the name of Urkowitz, incorporated herein by reference, pulse-to-pulse Doppler filter bank 212 may be preceded or followed by digital range mixers, digital oscillators, and pulse compression/sidelobe suppressors. In FIG. 2a, these elements follow the Doppler filter bank. In FIG. 2a, the digital mixers or multipliers are designated generally as 214, and each individual digital mixer is designated by the numeral 214 with a letter suffix, as for example 214a, 214b, ..., 214k. The input port of each individual digital mixer 214n is coupled to the output of one of the filters of Doppler filter bank 212 by way of a path 213, and receives an exponential or oscillatory signal (a local oscillator signal) at another input port over a data path 215, for mixing the exponential signal with the Doppler-filtered output of each Doppler filter of filter bank 212, for forming a frequency-converted output signal on an output signal path 216, which frequency-converted output signal includes a baseband component. For example, digital mixer 214a receives a Doppler-filtered signal component from Doppler filter bank 212 by way of a data path 213a, and multiplies it by an exponential signal applied over a signal path 215a, to produce a frequency-converted signal including a baseband component on path 216a, digital mixer 214b receives a Doppler-filtered signal component from Doppler filter bank 212 by way of a data path 213b, and multiplies it by an exponential signal applied over a signal path 215b, to produce a frequency-converted signal including a baseband component on path 216b, digital mixer 214c receives a Doppler-filtered signal component from Doppler filter bank 212 by way of a data path 213c, and multiplies it by an exponential signal applied over a signal path 215c, to produce a frequency-converted signal including a baseband component on path 216c, ..., digital mixer 214d receives a Doppler-filtered signal component from Doppler filter bank 212 by way of a data path 213d, and multiplies it by an exponential signal applied over a signal path 215d, to produce a frequency-converted signal including a baseband component on path 216d. Thus, each signal path 216 carries a baseband signal representing the amplitude of the particular Doppler frequency component which is selected by the associated Doppler filter of filter bank 212.

As described in the abovementioned Urkowitz U.S. Pat. No. 5,173,706, the digital mixer and associated exponential signal may be dispensed with if the corresponding Doppler frequency is at baseband; thus, if the $f_0$ filter of Doppler filter bank 212 is a baseband filter, mixer 214a and its associated exponential signal path 215a are not needed.

The baseband signal from each of mixers 214 (if used) of FIG. 2a is applied over a signal path 216 to a pulse compressor (PC) and range sidelobe suppressor (SS), known in the art, illustrated together as a block designated PC & SS. Each pulse compressor and range sidelobe suppressor 216 performs pulse compression and range sidelobe suppression, in known fashion, to produce pulse compressed and range sidelobe reduced pulses at baseband on an output signal path 217, where each baseband channel represents one of the Doppler frequencies of the returned echo. Thus, the baseband output of digital mixer 214a is applied by way of signal path 216a to a PC & SS block 218a for generating pulse compressed and sidelobe suppressed signals on a signal path 217a, the baseband output of digital mixer 214b is applied by way of a signal path 216b to a PC & SS block 218b for generating pulse compressed and sidelobe suppressed signals on a signal path 217b, the baseband output of digital mixer 214c is applied over a signal path 216c to a PC & SS block 218c for generating pulse compressed and range sidelobe suppressed signals on a signal path 217c, ..., and the baseband output of digital mixer 214k is applied over a signal path 216k to a PC & SS 218k for generating pulse compressed and range sidelobe suppressed signals on a signal path 217k.

While it is conventional to speak of "a" Doppler frequency, those skilled in the art know that each Doppler filter of Doppler filter bank 212 passes signals within a particular frequency range, albeit narrow, centered about the nominal Doppler frequency of that filter. Each combination of a Doppler filter 250 of filter bank 212, mixer 214, and PC & SS 218 constitutes a channel for processing of signals representing a particular Doppler frequency range.

The pulse-compressed, range sidelobe suppressed signals generated at the output of each channel (consisting of a Doppler filter 250 of filter bank 212, a mixer 214, and a PC & SS 218) is applied over a signal path 217 to further processing, according to the invention, in a processing block 224, and to other processing, as known in the art, represented in FIG. 2a as a Detection and Track Processing block 220. Thus, the Doppler filtered, pulse compressed, range sidelobe suppressed output of the channel including mixer 214a and PC & SS 218a is coupled to processor blocks 220 and 224 by way of signal paths 217a, 290 and 222, the Doppler filtered, pulse compressed, range sidelobe suppressed output of the channel including mixer 214b and PC & SS 218b is coupled to processor blocks 220 and 224 by way of a signal path 217b/222, the filtered, compressed, sidelobe suppressed output of the channel including mixer 214c and PC & SS 218c is coupled to processor blocks 220 and 224 by way of a signal path 217c/222, ..., and the Doppler filtered, pulse compressed, range sidelobe suppressed output of the channel including mixer 214k and PC & SS 218k is coupled to processor blocks 220 and 224 by way of a signal path 217k/222. Block 220 performs signal detection, track processing, target parameter estimation, and the like, all as known in the art. The processed signals produced by processor block 220 are applied over a signal path 27 to display 28 of FIG. 1.

Processing block 224 of FIG. 2a is illustrated as a series of blocks 226–234, where the hyphen represents the word "through." Blocks 226–234 may be viewed as a series of discrete blocks which sequentially perform certain processing steps, or as steps of a method performed by a processor designated 224. Naturally, in a modern digital system, blocks 226–234 are preferably implemented as part of the processing performed in block 220, and may be in the form of hardware where high-speed operation is necessary, software in those cases where maximum flexibility is desired, or a hybrid of both.

In general, the processing in processor 224, by the arrangement of blocks 226–234 of FIG. 2a, in accordance with the invention, examines the total power in each range cell, which is the integrated power at the output of all the Doppler channels for that range cell, to produce what amounts to a plot of spectral density or power as a function of quantized range. The peak magnitude of the returned power, and the range cell in which it occurs, are identified. Within that range cell under examination, which is the one in which the integrated power is a maximum, the spectral power density is examined by plotting or comparing the outputs of the Doppler filter channels, to determine the Doppler frequency at which the maximum spectral density of the returned energy occurs. In general, the maximum spectral density of the returned energy will not coincide with the center frequency of one of the Doppler filters of the Doppler filter bank. Interpolation is used to estimate the frequency at which the maximum value of the spectral power density occurs. Once the frequency of the maximum value of the spectral power density is determined, that one of the Doppler filters which is nearest in frequency is retuned, so as to have its center value coincide with the frequency at which the maximum value of the spectral power density occurs. This has the effect of minimizing the effect of phase errors on the sidelobe suppressor portion of the PC & SS block in that particular channel. Since the channel being retuned is the one in which the maximum spectral density occurs in that range trace, it tends to maximize the range sidelobe suppression in the region of maximum spectral density, where range sidelobes tend to have their greatest tendency to obscure targets.

In FIG. 2a, a block 240 represents a ROM preprogrammed with a set of Doppler filter coefficients, representing the initial or nominal frequency settings of all the Doppler filters of Doppler filter bank 220. These coefficients are applied to data paths 216a, 216b, 216c, . . . , 216k by a multipole switching arrangement illustrated as 244. Switching arrangement 244 is illustrated as a mechanical switching arrangement, but those skilled in the art realize that electronic equivalents of the switch are actually used. Switching arrangement 244 applies the coefficients produced by block 240 for each Doppler filter to a signal or data path of a bus 246 which is coupled to that Doppler filter of Doppler filter bank 212 for which it is intended. For this purpose, switching arrangement 244 includes twice as many movable contacts 244a, 244c, 244e, . . . 244g as there are Doppler filters, organized into two sets, with one open space 244o between sets of the movable contacts. Switching arrangement 244 includes one fixed contact set 244b, 244d, 244f, . . . , 244k for each Doppler filter of Doppler filter bank 212, where each set includes as many parallel paths as bus 246 carries. The poles of switching arrangement 244 are ganged together for simultaneous rotation, so that rotation of the switch merely moves the open space from one contact to the next, without affecting the continuity of other contacts. This configuration allows the preset coefficients from block 240 to be applied by way of data paths 246 to all of the Doppler filters of Doppler filter bank 212, or, by rotating the ganged poles, to apply the preset coefficients to all of the Doppler filters but one, where that one is the one which is to be retuned.

It should be noted that, in the arrangement as illustrated in FIG. 2a, the mixers follow Doppler filter bank 212 in the Doppler channels, and as a result, each Doppler filter 250 (FIG. 2b) of Doppler filter bank 212 of FIG. 2a is at a different frequency. Consequently, each Doppler filter 250 requires a different set of coefficients. If, as described above, the mixers were to precede Doppler filter bank 212, all the Doppler filters 250 of Doppler filter bank 212 would be at baseband, and would therefore be identical, and require the same set of coefficients. The requirement for the same set of coefficients would allow paralleling of the control or C inputs of all Doppler filters 250 of Doppler filter bank 212. However, the retuning of one of the cascaded channels would in that case be accomplished by changing the exponential signal applied to the mixer of the channel being retuned.

The input to Doppler Filter Coefficient Look-up Table ROM 234 of FIG. 2a is the difference in frequency between the peak frequency and the closest filter frequency, determined as described below. Look-up table ROM 234 contains values of Doppler filter coefficients for all pulse-to-pulse filters, and preferably includes adjustments for the range mixer-oscillators. The output of the processing represented by blocks 226–234 of FIG. 2a is in the form of Doppler filter coefficients, which determine the frequency to which a particular Doppler filter will be tuned. The coefficients of the filter which are to be changed are applied over a signal path 236 to a switching arrangement designated generally as 238. More particularly, movable contact 238m is coupled to receive signals from signal path 236, for coupling the signals to one of fixed contacts 238a, 238b, 238c, . . . , 238k. Fixed contacts 238a, 238b, 238c, . . . , 238k are in turn connected to signal paths of bus 246. Switching arrangement 238 is ganged with switching arrangement 244 for simultaneous rotation thereof, so that movable contact 238m of switching arrangement 238 always follows the open portion or gap 244o of switching arrangement 244. The combination of ganged switching arrangements 238 and 244 results in application of preset coefficients to all of Doppler filters 250 of Doppler filter bank 212 (when gap 244o does not fall on a fixed contact), or to all but a selected one of the Doppler filters 250 of Doppler filter bank 212, depending upon the rotational position of gap 244o of the ganged switch arrangements, and when one Doppler filter 250 does not receive preset coefficients, application to that filter of coefficients from block 234, which result in retuning of that particular Doppler filter in accordance with the estimation performed by blocks 226–234.

Each set of preset coefficients produced by ROM 234 of FIG. 2a, and the set of coefficients produced by processing in blocks 226–234, actually represents the frequency to which the center of a Doppler filter 250 is to be tuned. While each set of coefficients represents a frequency, they are not necessarily in a form which mixers 214 can use. In a preferred embodiment of the invention, ROM 234 includes, for each frequency, coefficients for mixers 214 as well as Doppler filter coefficients, and the mixer coefficients are simply applied to the mixers by way of a portion of bus 246. As an alternative, a translation block, illustrated as 260 in FIG. 2a, may be coupled to receive the various filter coefficients from data paths 246a–246k, for decoding the filter coefficients, and for generating exponential signals at the corresponding frequencies, for application of the exponential signals over signal paths 215 to mixers 214. Translation block 260 may include a plurality of controlled digital oscillators responsive to the filter coefficient values, for generating the local oscillator signal for converting the center frequency of the corresponding Doppler filter to baseband.

The preferred arrangement of the invention performs all the functions in software, eliminating switches 238 and 244 described in conjunction with FIG. 2b, and using ROMS preprogrammed with the various coefficients for all the filters. A change to a filter frequency is then accomplished by simply accessing the appropriate page of memory for each filter.

In order to explain the processing represented by blocks 226–234 of processing 224 of FIG. 2a, the assumption is made that the clutter is caused by weather phenomena, and the language is adapted to such a situation, but the clutter may be caused by other phenomena.

Figure 3A:
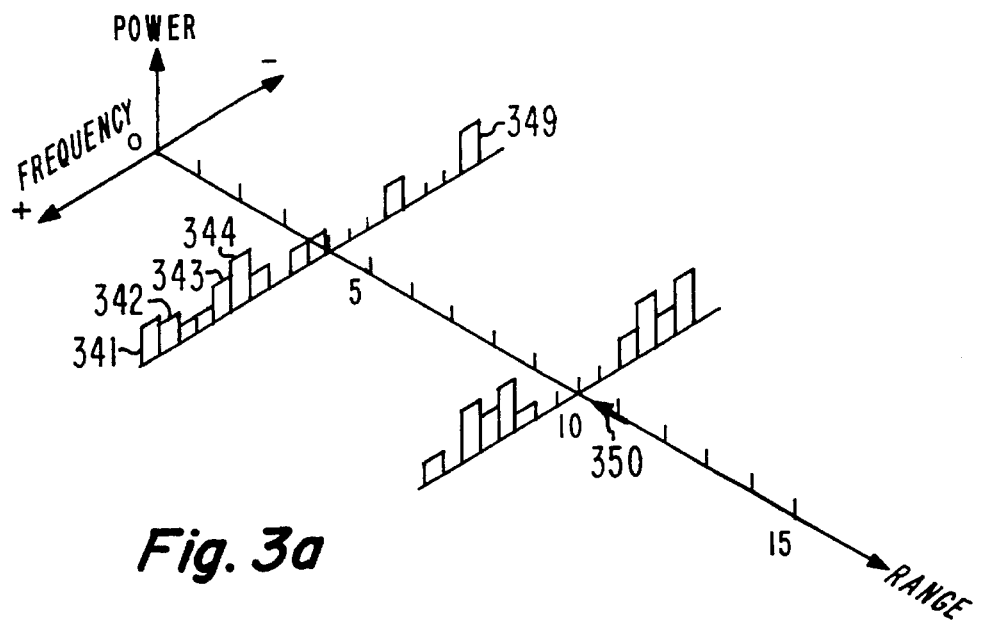
FIG. 3a is a perspective or isometric representation of a three-dimensional plot with a vertical axis representing power or amplitude, a first horizontal axis representing range, and a second horizontal axis representing Doppler frequency.
Figure 3B:
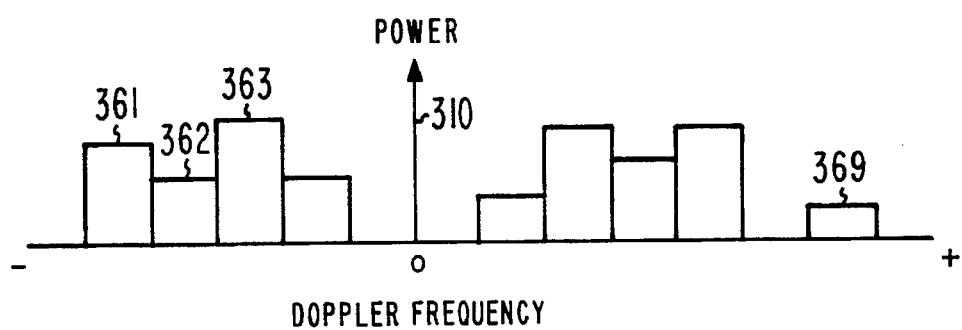
FIG. 3b is a view of the plot of FIG. 3a looking along the Doppler frequency axis.

In FIG. 2a, block 226 of processing 224 represents determining the echo power in each range bin of a range trace, and sorting to identify that range bin having the maximum echo power. This results in a periodogram (which is an estimate of the Doppler frequency spectrum power or power density spectrum) of the weather echo versus range for the current antenna beam position. The periodogram may be viewed as a range-quantized amplitude plot. FIG. 3a is a perspective or isometric representation of a three-dimensional plot with a vertical axis representing power or amplitude, a first horizontal axis representing range or time, and a second horizontal axis representing Doppler frequency. It should be noted that the Doppler frequency axis could, if desired, be calibrated instead in units of target velocity, in meters/second, for example. A Doppler frequency axis is associated with each range bin, but only two such axes are illustrated, at ranges 4 and 10, to simplify the drawing. At range bin 4, a plurality of power levels 341, 342, 343, 344, . . . , 349 are represented with power level 344, at range bin 4, being the largest. FIG. 3b is a view of the plot of FIG. 3a, looking at range bin 10 in the direction of arrow 350 in FIG. 3a, so that, in FIG. 3b, the range axis is perpendicular to the FIGURE. As illustrated in FIG. 3b, the $10^{th}$ range bin exhibits little ground clutter or zero Doppler energy, as indicated by the low power levels in intervals adjacent zero Doppler frequency.

Figure 3C:
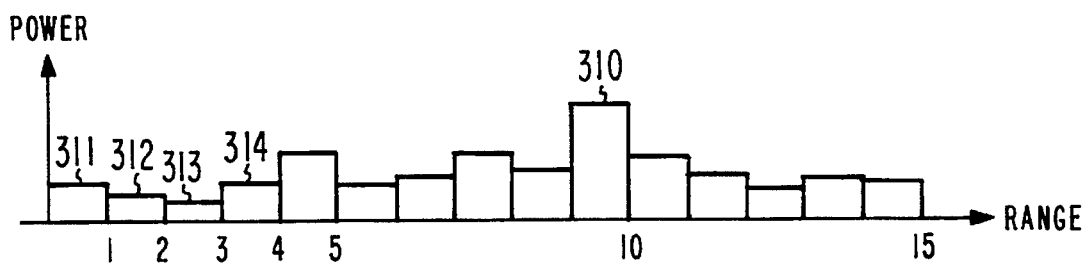
FIG. 3c is a view of the plot of FIG. 3a looking along the range axis.

FIG. 3c is a range plot similar to that of FIG. 3a, but in which the power axis represents the total power in each range bin, regardless of its Doppler frequency, and thus may be viewed as being the integrated power passing through all the Doppler channels at the range increment in question. The range axis is calibrated in units, and the total power at all Doppler frequencies for range increments or units 1, 2, 3 and 4 of FIG. 3c is illustrated by portions 311, 312, 313, and 314. FIG. 3c illustrates the total power at each range increment, and the total power values of 311, 312, 313, and 314 can be seen, together with other values of total power for other range increments, including range increment 310, associated with range interval 10. The total power represented by plot portion 314 of FIG. 3c also represents the sum of the power passing through the cascade including Doppler filters at the $4^{th}$ range increment, i.e. the sum or integral of powers represented in FIG. 3a as 341, 342, 343, 344, . . . , 349. Similarly, plot portion 310 of FIG. 3c represents the sum of the powers at each Doppler frequency increment of the $10^{th}$ range increment, i.e. the sum of the powers represented by plot portions 361, 362, 363, . . . , 369 of FIG. 3b. As illustrated in FIG. 3c, integrated power 310 is the maximum value of power received at any range for the illustrated range trace. This maximum power represents the highest reflectivity of the weather phenomenon.

In radar meteorology, it is of interest to estimate the spectral moments from the sequence of complex envelopes of the echo signal. These spectral moments are used to estimate radar reflectivity, mean closing velocity, and velocity spread of a diffuse or distributed signal such as a weather phenomenon. A number of conventional signal processing arrangements exist for performing various analyses of the returned pulses. Such programs include, for example, determination of spectral moments, as described in *Doppler Radar and Weather Observations*, Richard J. Doviak and Dusan S. Zrnic, Academic Press 1984, ISBN 0-12-221420-X, §6.4.1, page 103 et seq; §6.5.1, page 108 et seq, for estimating mean closing velocity, velocity spread and radar reflectivity of a diffuse target. Block 226 of FIG. 2a preferably also estimates weather spectrum moments other than the zero$^{th}$ moment (the echo power), and supplies the results over a path 227, which may be a logic path, for further conventional processing and display.

To reiterate, block 226 of FIG. 2a represents determination of the values of the zero$^{th}$ moment of echo power for the plurality of range bins, and comparison to find that one range bin at which the largest value of echo power occurs, which, in the example of FIGS. 3a and 3c, would correspond to range bin 10. Block 228 of FIG. 2a represents, for that range bin determined by block 226 to contain the maximum echo power (range bin 10 in the example), the examination of the spectral values of the periodogram (FIG. 3b) resulting from Doppler filtering (with the preset coefficients for the initial pass), and determining the Doppler frequency at which the maximum amplitude occurs. This maximum value does not necessarily correspond with plot portion 363 of FIG. 3c. The frequency of maximum Doppler signal amplitude will, in general, not coincide with the peak of one of the Doppler filters 250 of FIG. 2b when using the preset coefficients, nor from range trace to range trace, even if the previous value of the Doppler filters was optimized, so interpolation is used in block 228 to estimate the actual frequency at which maximum Doppler signal amplitude occurs. Any suitable interpolation technique may be used to determine the power density spectrum peak, but simple linear interpolation is believed not to be satisfactory. One satisfactory technique is described in U.S. Pat. No. 3,943,346, issued Mar. 9, 1976 in the name of Urkowitz et al.

Once the frequency of the peak value of the spectral density is estimated in block 228 of FIG. 2a, that Doppler filter 250 (FIG. 2b) of Doppler filter bank 212 which is closest in frequency to the estimated frequency of the power density spectrum peak is identified in block 232 of FIG. 2a. The filter frequency closest to the peak frequency is determined in block 232 of FIG. 2a by a sorting routine that compares filter frequencies with the peak frequency. The output of block 232 is applied as addresses to lookup table ROM 234, and is also applied to control the position of switch arrangements 238 and 244. For example, if block 232 determines that Doppler filter 250b of FIG. 2b is closest to the estimated frequency, switches 238 and 244 of FIG. 2a are rotated to decouple preset coefficient memory 240 from control signal path 246b and Doppler filter 250b, and to instead couple a set of filter coefficients from ROM 234 by way of control signal path 246b to the C input port of Doppler filter 250b. The new coefficients on control signal path 246b retune Doppler filter 250b of filter bank 212 to the estimated frequency. Since the processing is preferably performed in software, the pulse compression and sidelobe suppression can be performed again, with the optimized Doppler filter. The new frequency of the retuned Doppler filter is held for the processing of one entire range trace, preferably the same range trace for which the estimated frequency was obtained, but possibly for a temporally contiguous or adjacent range trace, if the weather phenomenon is known to remain static over a range pulse interval. It would be possible to perform the processing of block 224 of each range trace with either the preset Doppler filter coefficients, or with filter coefficients adjusted for optimization of the previous range trace; simplicity of processing suggests that the preset coefficients should be used.

Each processing step described in conjunction with blocks 226, 228, and 232 is either described in the art and fully accessible to, and usable by, a person of ordinary skill in the art, as in the case of the determination of moments in block 226, or so simple in concept as to require only moderate skill in signal processing, much less than average skill in the art, as in the case, for example, of determining which of several filters has its frequency closest to a particular frequency. Thus, no detailed mathematical description of the various processing steps is believed to be necessary. It should be noted that the zero-Doppler ground clutter at any range may be larger than weather echoes. Consequently, it is desirable to provide ground clutter filtering before the processing represented by block 226. This may be accomplished by a ground clutter filter (not illustrated) located in path 211 between ADC 210 and Doppler filter bank 212, or, in that situation in which one of the Doppler filters is a baseband filter, disconnecting that coupling line, such as dash-line coupling line 290, which connects the baseband channel to the processing of block 226.

When Doppler filter 250b of FIG. 2b is retuned by the new set of filter coefficients from ROM 234 of FIG. 2a in the above example, the center frequency of Doppler filter 250b changes slightly. As a result of the change in center frequency of Doppler filter 250b, its associated mixer 214b, if it continued to provide the same frequency conversion, would convert to baseband a frequency which passes on the skirt of Doppler filter 250b. As mentioned above, this might result in a degradation of the range sidelobe suppression by the range sidelobe suppression portion of PC & SS 218b. The degradation is avoided by retuning of the exponential signal applied over signal path 215b by translation block 260 (or, if ROM 234 also stores mixer coefficients in addition to filter coefficients, no translation block is needed), so that the local oscillator signal applied to mixer 214b is modified so that the new center frequency of Doppler filter 250b is converted to baseband by mixer 214b. This requires, of course, only that the local oscillator signal applied to a mixer have a frequency equal to the center frequency of the associated Doppler filter. The adjusted mixer conversion is held for the entire range trace, to conform to the adjustment of the associated Doppler filter.

Figure 4:
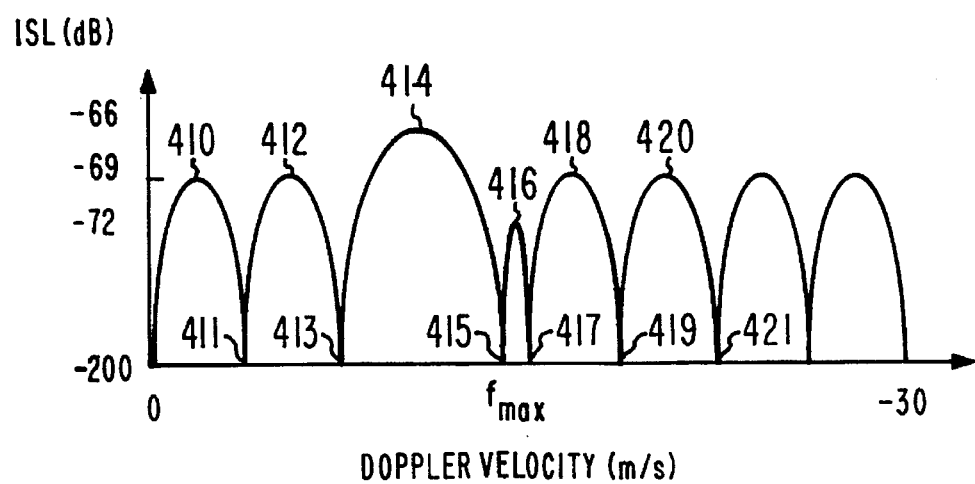
FIG. 4 is a plot of integrated sidelobe level (ISL) in dB versus Doppler velocity, showing the effects of retuning of a single Doppler filter on the range sidelobe level.

When that Doppler filter, which is closest to the frequency of the peak value of the Doppler frequency periodogram (FIG. 3b) associated with that range bin (range bin 10 in FIG. 3c) at which the total integrated energy occurs, is retuned to the estimated Doppler frequency at which maximum energy occurs, the integrated range sidelobes at the frequency of the peak power are maximally suppressed. However, as mentioned above, the suppression of range sidelobes is sensitive to phase shifts, and may not be not optimal for frequencies on the skirts of the Doppler filters. FIG. 4 is a plot of integrated sidelobe level (ISL) in dB versus Doppler velocity, with the frequency at which the maximum power occurred indicated as $f_{MAX}$. The plot of FIG. 4 represents conditions in which twenty-element complementary code pairs of transmitter pulses are used, and that one Doppler filter (250b of FIG. 2b), which was closest to the frequency of the maximum spectral power ($f_{MAX}$) at the range at which maximum spectral density occurred in the echo, is retuned toward the frequency of maximum spectral density. The retuning necessarily readjusts the center frequency of one of the Doppler filters toward an adjacent Doppler filter, and away from the other adjacent Doppler filter. The ISL level is in the form of a plurality of peaks 410, 412, 414, 416, 418, 420, with nulls 411, 413, 415, 417, 419, . . . occurring between the peaks. Each null in the ISL occurs at the center frequency of one of the Doppler filters 250 of Doppler filter bank 212 of FIG. 2a. Null 415 represents the peak of retuned Doppler filter 250b. The peak value of ISL before retuning was about −70 dB. The ISL level is indicated in FIG. 4 as having been reduced at null 415 to −200 dB or more (at $f_{MAX}$), which desirably reduces the range sidelobe contribution attributable to the maximum value of spectral power density along the range trace. However, the ISL undesirably reaches a peak value in the range of −66 dB adjacent $f_{MAX}$, on peak 414, as a result of the increase in frequency spacing between the two adjacent Doppler filters (between nulls 413 and 415). The −66 dB level exceeds the suppression of at least about −70 dB at all other frequencies. Thus, while the integrated range sidelobes are maximally suppressed at $f_{MAX}$ by retuning one of the Doppler filters, the retuning may also reduce the suppression at other frequencies.

According to another aspect of the invention, all of the Doppler filters are retuned in response to the estimated maximum spectral power density determination, to maintain the minimum value of range sidelobe suppression substantially constant across the frequency band. In general, this is accomplished, after estimation of the frequency at which the maximum spectral density occurs, by simply setting the nearest Doppler filter to that particular frequency, as described generally above, and then retuning each of the other Doppler filters to have a fixed offset frequency from the next adjacent filter, where all the offset frequencies are equal. The mixers associated with each of the Doppler filters are also retuned to match the new center frequencies of the associated Doppler filters. The adjustment is made to all of the pulse-to-pulse filters and range mixer-oscillators so that the filter frequencies remain equally spaced with the closest filter to the peak frequency modified in tuned frequency so that it coincides with the frequency peak. As in the case of the single-filter retuning, the retuned state of the entire set of Doppler filters is held for one entire range trace.

Figure 5:
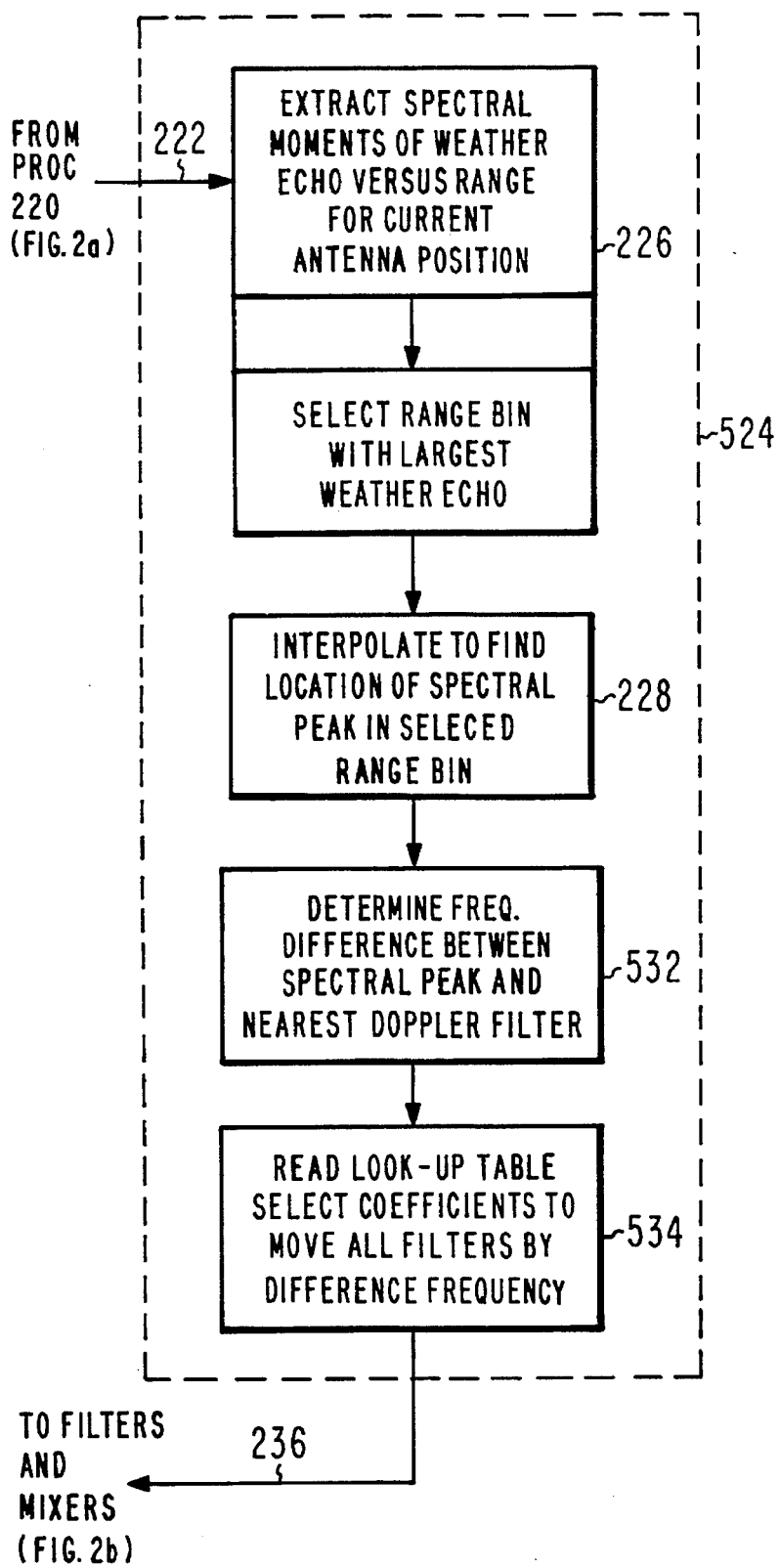

FIG. 5 represents signal processing designated 524, which is an alternative to the processing of block 224 of FIG. 2a. The processing of block 524 receives range trace data over path 222, and performs processing corresponding to that described above in blocks 226 and 228. The estimated location of the spectral peak is applied from block 228 to a block 532, which determines the difference frequency between the location of the spectral peak and the center value of the adjacent Doppler filter. For this purpose, the term "center value" is a value in the center of the frequency excursion attainable by a filter. It is only necessary for any one Doppler filter to be capable of tuning to ± one-half the nominal filter-to-filter spacing, which allows tuning one filter to any frequency within the range of the Doppler filter bank (within the resolution provided by the coefficients). Limiting the range of excursion of each filter, in turn, reduces the number of pages of ROM memory which must be maintained for each Doppler filter of the filter bank. The frequency difference is applied to a look-up table in block 534, which moves all the filters by the same amount. Since all the filters move by the same amount, a null falls on the maximum spectral density, and the inter-null spacing remains the same, so that the ISL remains constant.

The embodiments described in conjunction with FIGS. 2a, and 2b, and 5, are suitable for any form of periodically transmitted pulse compression waveform. Such waveforms include biphase and polyphase modulated waveforms, and linear and nonlinear FM waveforms, together with any form of amplitude modulation including constant amplitude over the pulse duration.

The embodiments of FIGS. 2a, 2b, and of 5, show pulse compression and sidelobe suppression as a block including two cascaded filtering operations. These may be combined into one filter to accomplish the combined task. An alternative to this combined filtering operation is a direct inverse filter acting as a deconvolution filter which is designed to take the received dispersed pulse and produce an impulse or narrow pulse at the output with minimum range sidelobes, all of which are known in the art.

Other embodiments of the invention will be apparent to those skilled in the art. For example, antenna 16 of FIG. 1 may be a reflector-feed antenna, or it may be an antenna array, either passive or active. The antenna may produce a single beam, or it may produce multiple beams, as for example it might be a monopulse antenna, which produces sum and difference beams in at least one plane. The technique of adapting the Doppler frequency response may also be applied to complementary code waveforms, such as those described in the abovementioned U.S. Pat. No. 5,151,702. While the described embodiment has all the Doppler channels adjustable in frequency, some may be kept fixed if the Doppler frequencies of interest do not extend to those frequencies.

What is claimed is:

1. A radar system, comprising;

transmitting means for transmitting pulses of energy toward a target, for generating echo signals;

receiving means for receiving said echo signals, for generating received signals;

a plurality of Doppler filters, each of which is cascaded with a multiplier for forming a like plurality of cascaded channels, each of said cascaded channels including a received signal input port, a signal output port, and a frequency control signal input port, said received signal input port of each of said cascaded channels being coupled to said receiving means for receiving said received signals therefrom, for, in each of said channels, narrowband filtering the signals passing therethrough about a center frequency controllable in response to a frequency control signal, and for, if necessary, converting said signals passing therethrough to baseband, for thereby generating one of a plurality of Doppler filtered baseband signals at said output port of each of said cascaded channels, each of which Doppler filtered baseband signals is representative of a different range of target velocities;

signal processing means coupled to said signal output port of each said plurality of Doppler filters for receiving said Doppler filtered baseband signals therefrom, and for processing said Doppler filtered baseband signals for determining which range bin has the greatest amplitude attributable to echo signals, and for determining said amplitude, to thereby generate maximum reflectivity signals;

Doppler power spectrum determining means coupled to said signal processing means for receiving said maximum reflectivity signals therefrom, for generating an estimate of the power spectrum of said maximum reflectivity signals to determine a maximum-power frequency; and control means coupled to said Doppler power spectrum determining means and to said plurality of cascaded channels, for generating and applying said frequency control signal to said frequency control input port of at least one of said cascaded channels, for controlling said cascaded channels such that at least said one of said cascaded channels has its said center frequency at said maximum-power frequency.

2. A radar system according to claim 1, wherein said cascaded channels comprise digital signal processing means controllable by coefficients, and said control means comprises:

memory means preprogrammed with sets of information, each set representing coefficients which establish a unique response of one of said cascaded channels.

3. A method for identifying a remote target, comprising the steps of:

transmitting pulses of energy toward said target, for generating echo signals;

receiving said echo signals, for thereby generating received signals organized into range traces;

applying said received signals through a plurality of Doppler filters, each of which iS cascaded with a multiplier to thereby form a like plurality of cascaded channels, for, in each of said channels, narrowband filtering the signals passing therethrough about a controllable center frequency, and for, if necessary, converting said signals passing therethrough to baseband, for thereby generating one of a plurality of Doppler filtered baseband signals at the output of each of said cascaded channels, each of which Doppler filtered baseband signals is a range trace representative of a different interval of target velocities;

determining, for each range trace of each of said Doppler filtered baseband signals, at least that one range bin of said range trace which has the greatest amplitude attributable to echo signals, and generating an amplitude signal representative thereof;

generating an estimate of the power spectrum of said amplitude signals of said one range bin to determine a maximum-power frequency; and controlling said cascaded channels such that at least said one of said cascaded channels has its said center frequency at said maximum-power frequency.

* * * * *